United States Patent [19]

Larson et al.

[11] 4,148,392
[45] Apr. 10, 1979

[54] VISCID MATERIAL CONVEYOR

[75] Inventors: Charles Larson, Bellevue; Melvin Van Nocker, Battle Creek; Robert Sutton, Kalamazoo, all of Mich.

[73] Assignee: PRAB Conveyors, Inc., Kalamazoo, Mich.

[21] Appl. No.: 814,287

[22] Filed: Jul. 11, 1977

[51] Int. Cl.² .............................................. B65G 45/00
[52] U.S. Cl. .................................. 198/498; 198/716; 198/735; 198/838
[58] Field of Search ............... 198/716, 700, 734, 735, 198/703, 701, 598, 498, 497, 838, 861, 733, 836

[56] References Cited

U.S. PATENT DOCUMENTS

| Re. 22,789 | 9/1946 | Brunner | 198/716 |
|---|---|---|---|
| 2,811,241 | 10/1957 | Bogaty | 198/494 |
| 3,485,342 | 12/1969 | Fechter | 198/498 |

FOREIGN PATENT DOCUMENTS 2357353 5/1975 Fed. Rep. of Germany ........... 198/498

Primary Examiner—Robert B. Reeves
Assistant Examiner—Douglas D. Watts
Attorney, Agent, or Firm—Dressler, Goldsmith, Clement, Gordon & Shore, Ltd.

[57] ABSTRACT

A closed loop conveyor for viscid material is provided with a plurality of spaced, planar conveying flights within a material conveying conduit. The flights are mounted on an endless transporting chain and are moved from one or more charge stations where material is loaded into the conduit to one or more gravity discharge stations where the material falls out of the conveyor. At the discharge station the planar conveying flights are scraped clean by a rotatable assembly. The assembly preferably comprises a circular plate mounted for rotation in a generally vertical plane adjacent to the conveying path and about a substantially horizontal axis. A number of scraper blades are mounted on the circular plate substantially uniformly, peripherally spaced from one another and extend away from one side of the plate in a generally horizontal direction toward a conveying path defined by movement of the flights. The axis of rotation for the circular plate extends across the general direction of the conveying path and is situated below the discharge station, whereby each of the planar conveying flights periodically engages a scraper blade causing the circular plate to rotate as the scraper blade moves forwardly and upwardly with respect to the surface of the conveying flight thereby scraping the viscid material from the flight.

13 Claims, 5 Drawing Figures

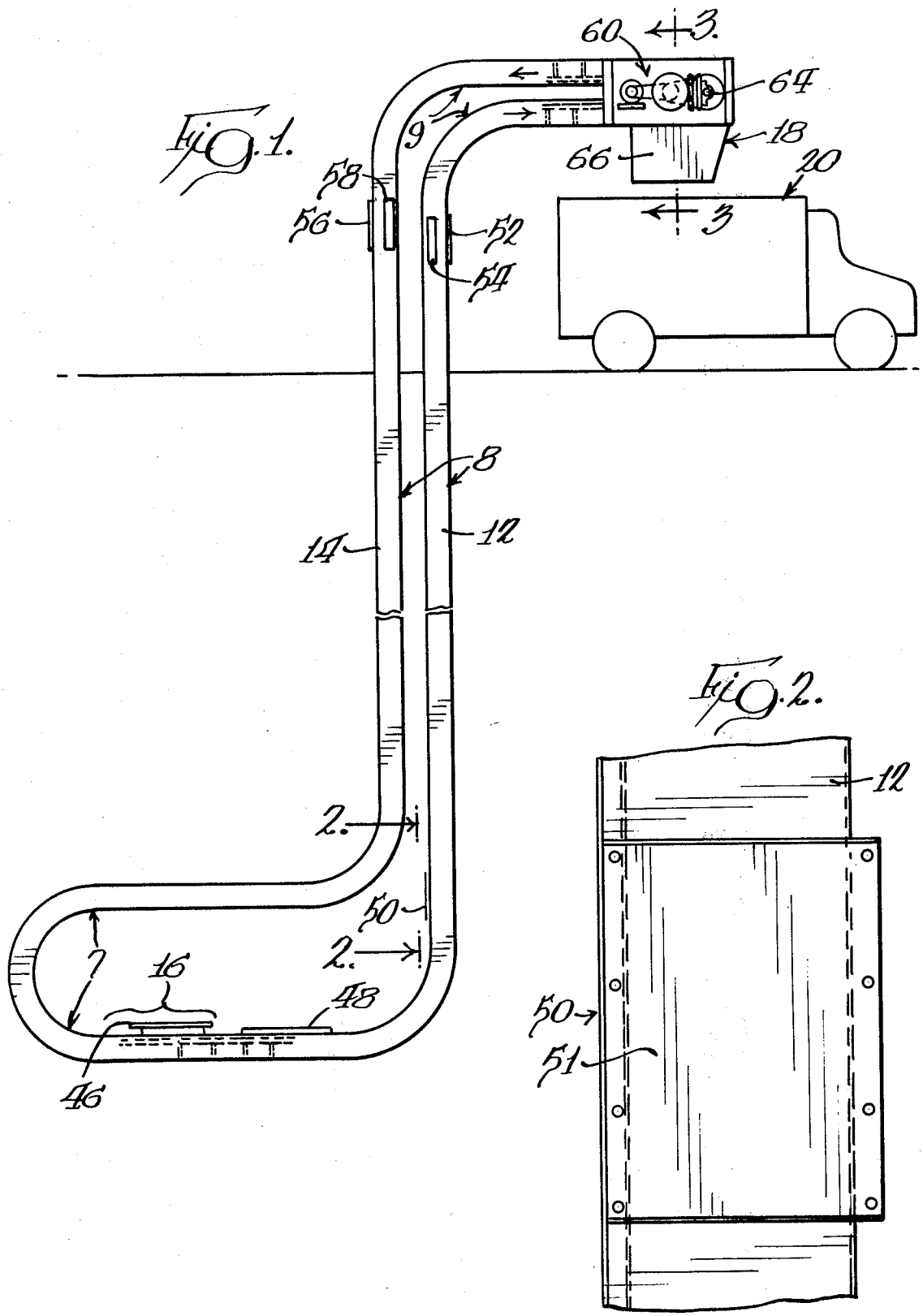

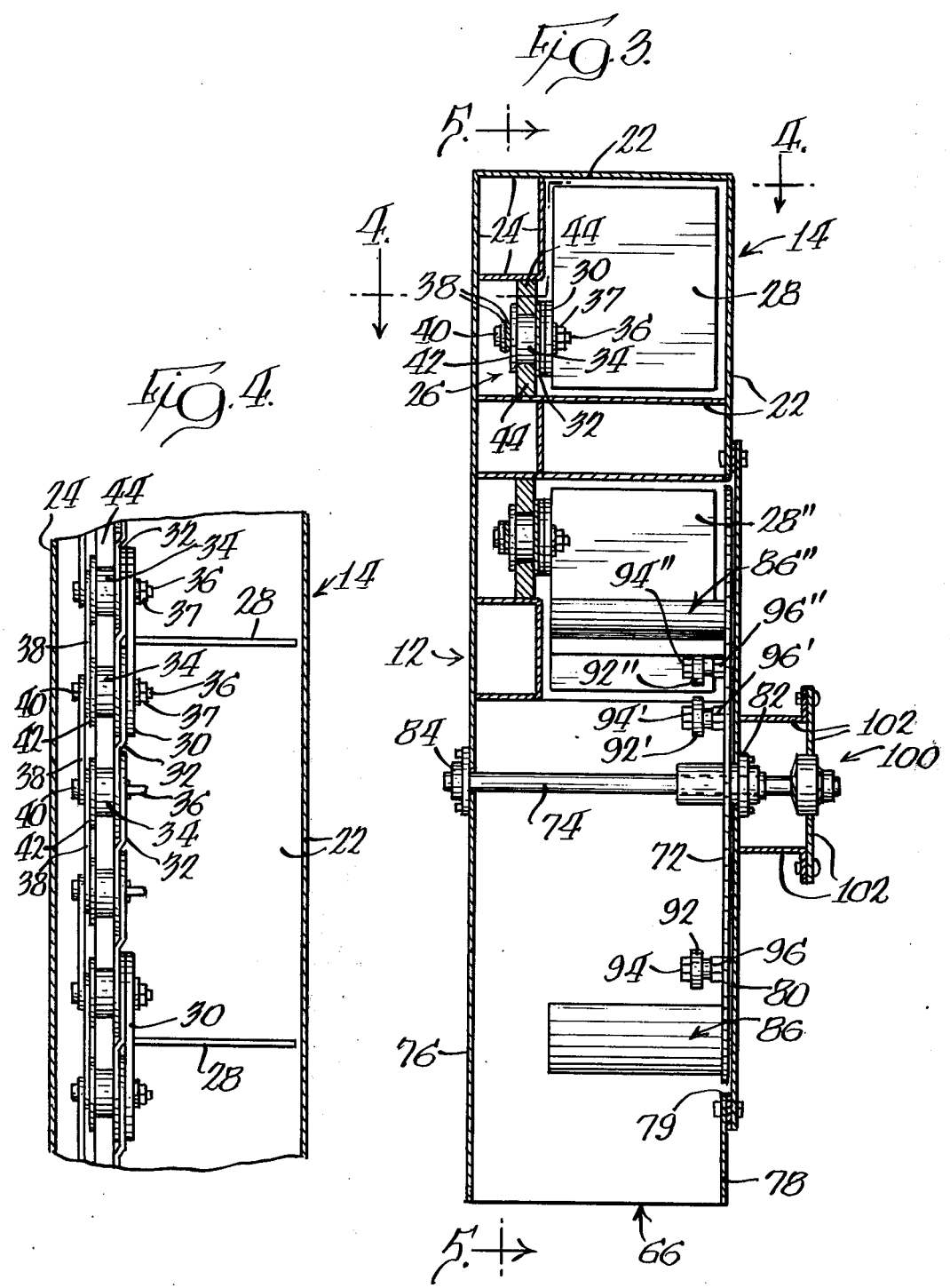

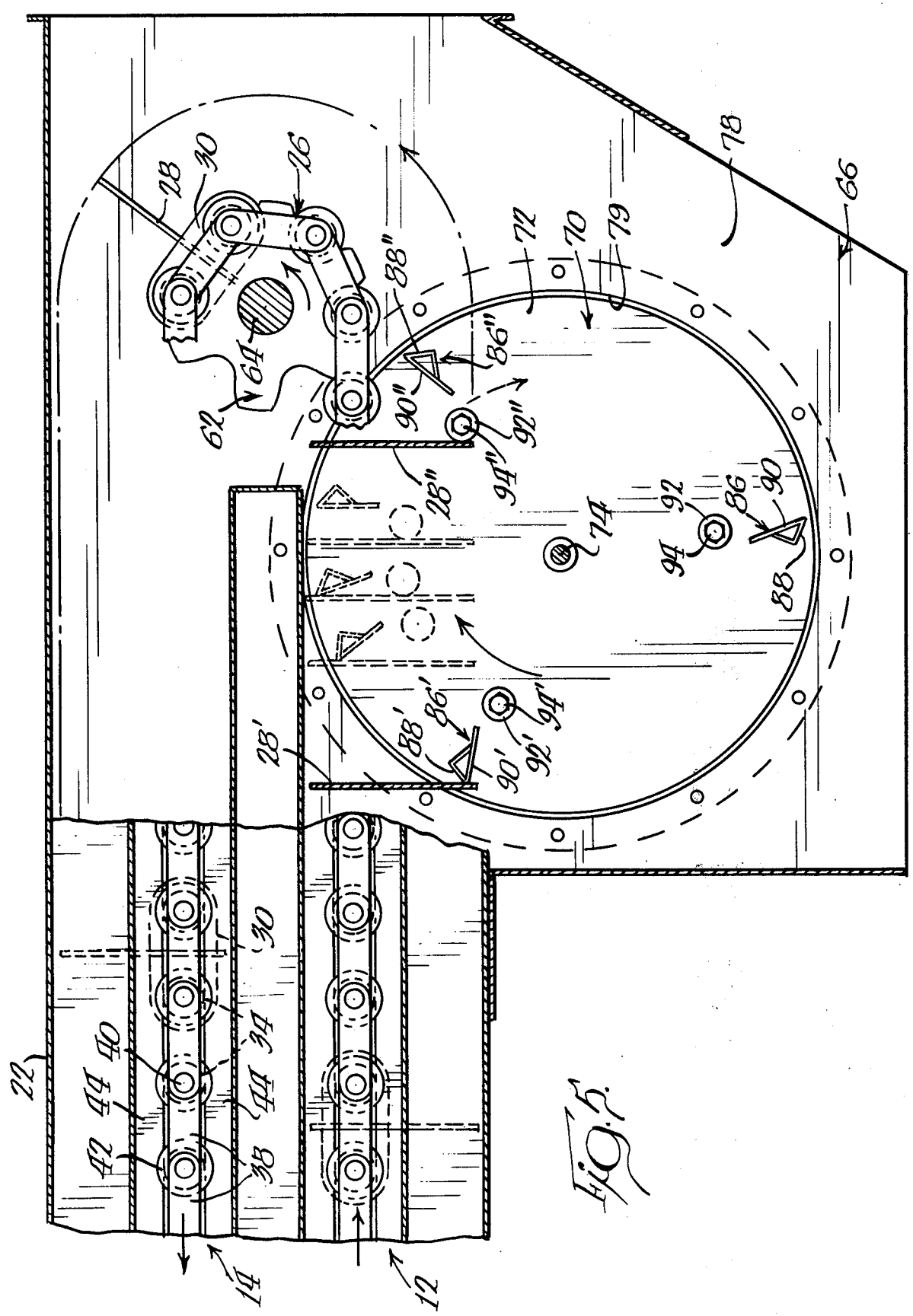

VISCID MATERIAL CONVEYOR

BACKGROUND OF THE INVENTION

This invention relates to conveyors, and more particularly to totally or partially enclosed tubular conduit conveyors which move the conveying material by power driven flights within the conduit.

Most commonly, such tubular conveyors operate on the "endless chain" principle and generally comprise a complete loop conveying path wherein a charging station or stations are provided in a certain area of the conveying loop, and wherein a discharge station is provided at another portion of the conveying loop. Typically, the conduits of completely, totally enclosed tubular conveyors have (1) a liquid tight conveyor casing, usually of a round, square or rectangular cross section, (2) an endless chain mounted therein, and (3) generally round, square or rectangular planar conveyor plates or flights centrally secured to the chain and oriented generally perpendicularly to the conveyor casing walls.

Totally or partially enclosed tubular conveyors are commonly used for transporting dry granular materials, mill scale and metal chips from metal working processes, and sticky or viscid materials such as filter cake, paint, grinding sludge, and sewage sludge. Though tubular conveyors work well with non-sticky or non-viscid materials, the use of tubular conveyors with sticky or viscid materials has certain drawbacks. Such drawbacks are also experienced with other types of conveyors.

Specifically, viscid material adheres to the conveyor flight plates in large clumps or globs and much of the material fails to drop off of the flights at the discharge station. The viscid material remaining on the flights continues around through the return leg of the conveying loop back to the charging station or stations. Thus, at the charging station, the amount of material that can be introduced into the conveyor is reduced by the amount of viscid material that is still stuck to the conveyor flights and is recirculating through the conveyor. Obviously, this (1) reduces the total conveying efficiency, (2) adds an increased conveying load upon the conveyor drive system and thus requires more energy for conveyor operation, and (3) leads to increased abrasive and scraping wear in the return portion of the conveyor.

It would be desirable to provide a flight conveyor for use with viscid materials which has an assembly or mechanism for removing or scraping the viscid material from the flights at the discharge station. It would also be desirable that such a flight scraper assembly operate simply and efficiently and preferably be driven by the conveyor flights themselves so that the scraper assembly would not require a separate drive or power source and so that it would not require any complex transmission and/or gear drive mechanisms.

SUMMARY OF THE INVENTION

A flight conveyor and flight scraper assembly is provided by this invention whereby material transported by conveyor flights in a conveying conduit is automatically scraped from the flights at a discharge station. To this end, the flights are carried by an endless articulated member, such as a chain, slidably mounted between an upper and lower track to one side of the conveying conduit defining a conveying path, and contact a rotatable scraper assembly at the discharge station. The links on the side of the chain exposed to the conveying conduit are so wide as to cover the chain bushings and overlap the upper and lower track, thereby preventing the conveyed material from flowing between the tracks and the chain bushings, and thus reducing the possibility of clogging the chain. Preferably, one end of each link is offset relative to the other end thereof.

In a preferred embodiment, the scraper assembly comprises a circular rotatable plate mounted for rotation in a generally vertical plane adjacent to the conveying path at the discharge station and about a substantially horizontal axis. A plurality of elongated scraping protuberances or scraper blades are mounted substantially uniformly spaced about the circular plate and extend away from one side of the plate in a generally horizontal direction into the conveying path. The axis of rotation for the circular plate extends across the general direction of the conveying path and is situated below the discharge station. As the planar conveyor flights are moved forward through the discharge area, each flight engages one of the scraper blades, near the bottom of the flight, and causes the circular plate to rotate about the axis as the scraper blade moves forwardly and upwardly against the leading surface of the conveyor flight thereby scraping viscid material off of the flight. The viscid material falls downwardly out of the conveyor discharge opening by gravity.

Preferably, to assist the rotation of the scraper assembly, a plurality of roller bearing members is provided on the circular plate so that one roller bearing is associated with, and is spaced radially inwardly of, each scraper blade. In this manner, as the circular plate rotates, and as the scraper blade moves forwardly and upwardly along the leading surface of the conveyor flight, the roller bearing member moves closer to the leading surface of the conveyor flight, and when the circular plate has rotated to a position where the scraper blade has been driven to near the top of the conveyor flight, the roller bearing is engaged by the conveyor flight below the scraper blade. As the conveyor flight continues to move forward, the circular plate begins to be driven by the roller bearing and continues to rotate as a result of the engagement between the conveyor flight and the roller bearing. At the same time, the scraper blade, being mounted radially outwardly of the roller bearing, moves forward of, and out of engagement with, the conveyor flight and continues to move increasingly further away from the conveyor flight as the circular plate continues to rotate. The circular plate continues to be driven by the roller bearing until the roller bearing moves out of engagement with the bottom end of the flight, at which time the next succeeding conveyor flight has entered the discharge area adjacent the circular plate, engages the next scraper blade, and drives the scraper blade and circular plate in the same manner.

Thus, in a preferred embodiment the flight scraper assembly of the present invention is entirely driven, simply and efficiently, by the conveyor flights themselves, thereby eliminating the need for complicated chain or gear drive mechanisms or separate drive mechanisms.

Additionally, since the conveyor flights are carried by an endless chain having links that protect the chain from the material being conveyed, clogging and undue wear of the chain drive mechanism are minimized.

Numerous other advantages and features of the present invention will become readily apparent from the following detailed description of the invention, from the claims and from the accompanying drawings.

BRIEF DESCRIPTION OF THE DRAWINGS

In the accompanying drawings forming part of the specification, and in which like numerals are employed to designate like parts throughout the same, FIG. 1 is a side elevational view showing the conveyor of the present invention arranged to receive material at one elevation and transport it to a higher elevation where it is discharged into a truck;

FIG. 2 is an enlarged view taken generally along the plane 2—2 in FIG. 1;

FIG. 3 is an enlarged, sectional view taken generally along the plane 3—3 in FIG. 1;

FIG. 4 is a cross-sectional view taken generally along the plane 4—4 in FIG. 3; and FIG. 5 is a cross-sectional view taken generally along the plane 5—5 in FIG. 3.

DESCRIPTION OF THE PREFERRED EMBODIMENT

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

For ease of description, the apparatus of this invention will be described in normal operating position, and terms such as upper, lower, horizontal, etc., will be used with reference to this normal operating position. It will be understood, however, that apparatus of this invention may be manufactured, stored, transported and sold in an orientation other than the normal operation position described.

The apparatus of this invention has certain conventional drive mechanisms and control mechanisms the details of which, though not fully illustrated or described, will be apparent to those having skill in the art and an understanding of the necessary functions of such drive mechanisms.

The conveyor and scraper assembly of the present invention is illustrated in FIG. 1 and is generally designated by numeral 6 therein. The conveyor is illustrated as having a horizontal lower run 7, a substantially vertical middle run 8, and a horizontal upper run 9 all defining a closed conveying loop having a feeding or conveying leg 12 and a return leg 14. The inlet or charge station 16 is located in the lower run at one elevation and an outlet or discharge station 18 is located in the upper run at a higher elevation. The conveyed material is discharged out of the discharge station 18 under the influence of gravity to an appropriate receiving means, such as truck 20. However, the conveyor 6 need not be limited to the orientation illustrated in FIG. 1 or need not be used with a truck as a receiver of the discharged material. The conveyor 6 may be oriented substantially horizontally or may be oriented with some portions of the conveying path inclined with respect to the horizontal. Further, the conveyor may move material from one work station to another station or from one type of processing equipment to another type of processing equipment, as desired.

The conveying and return legs, 12 and 14, are preferably totally enclosed conduits having a square or rectangular cross section. As illustrated in the top portion of FIG. 3, the return leg conduit 14 is defined on three sides by walls 22. The fourth side of the conduit comprises a structural square tube member 24 and a chain assembly 26 guided by upper and lower tracks 44.

As illustrated in FIGS. 3 and 4, conveyor flights 28 are located at spaced intervals within the conveyor conduits. The conveyor conduit and flight structures in both the conveying and return legs are identical, though reversed from one another in mirror image symmetry. While the structure of the conduit and flights will be next described with respect to the return leg 14 of the conveyor as illustrated in FIGS. 3 and 4, it is to be understood that the structure of the conveying leg 12 is the same.

With reference to FIGS. 3 and 4, the flights 28 are generally rectangular plates mounted on a flight transport means such as the chain assembly 26 positioned on one side of the conduit and project into the conveying path. Specifically, each flight 28 is secured in a substantially perpendicular orientation to a side bar 30 which is in turn pivotally mounted at each end, together with two overlapping inner chain side links 32, on chain pins 36. In a preferred embodiment, the side bar 30 is secured to pins 36 by locknuts 37. Chain bushings 34, on chain pins 36, separate side links 32 from outer side links 38. As best viewed in FIG. 4, each side link 32 is somewhat Z-shaped and has a first half parallel to, but offset from, a second half. The first half of one link fits in face-to-face relation with the second, offset half of an adjacent link.

On the side of the chain assembly 26 opposite the inner side links 32 the chain bushings 34 are secured with the pins 36 to outer side links 38 which, on each end, overlap an adjacent link and are held in pivoted mounting engagement on pin 36 by head 40 of pin 36. Spacers, such as flange wheels 42, provide an appropriate bearing surface on one side of the chain assembly 26 for laterally restraining the chain in the slot formed between spaced-apart upper and lower guide rails or tracks 44 in cooperation with the inner side links 32 on the other side of the chain.

It is important to note that the inner side links 32 overlap the upper and lower tracks 44, and thereby prevent the ingress of conveyed material into chain assembly 26. In this manner, the conveyed material is kept from contacting and plugging the chain bushings, tracks, and links.

It should also be noted that the flights 28 do not extend completely to the conduit sidewalls 22 and that a slight clearance is thus provided to minimize wear on the flights and the sidewalls. The flights 28 are preferably secured to the side bar 30 by welding. However, should a flight break off or become damaged, it can easily be replaced by removing the side bar 30 and rewelding a new flight 28 to the side bar or by providing a completely new assembly of side bar 30 and flight 28. The side bar 30 is easily removed, without "breaking" the chain assembly 26, by disengaging the locknuts 37 from pins 36.

A plurality of openings is provided in the conveyor conduit. With reference to FIG. 1, the feed or conveying leg 12 of the conveyor 6 may be loaded at the charge station 16 through one or more inlet opening structures, such as structure 46. Should access to the flights, chain or other internals of the conduit be desired, inspection and access may be had through covered inspection ports, such as ports 48, 50, 52, 54, 56 and 58. Inspection port 50 is illustrated in more detail in FIG. 2 and comprises a cover plate 51 positioned over an aperture in one of the sidewalls of the conduit and bolted to the conduit around the periphery of the aperture.

As viewed in FIG. 1, the flights are moved in a counterclockwise direction in the conveyor, from the charge station 16 to the discharge station 18, by the chain assembly 26 which is driven by conventional motor drive system, preferably at one end of the conveying loop, e.g., drive system 60 located above the discharge station 18. The drive system 60 includes an electric motor coupled through a belt-driven speed reducing sheave assembly to a conveyor chain drive shaft 64 in a conventional manner. The details of such construction and operation are well known in the art and are not described herein.

As illustrated in FIG. 5, sprocket 62 engages the chain assembly 26 at the distal end of the conveyor loop. Sprocket 62 is driven through chain drive shaft 64 by drive system 60. To accommodate chain length adjustments and chain wear, shaft 64 is mounted across the end of the conveyor in elongate sidewall slots (not shown) in a conventional manner.

While the discharge station 18 shown in FIG. 1 is located at the distal end of the conveying loop below the chain drive system 60, the discharge station 18 may be located in any convenient, substantially horizontal portion of the conveying loop. However, in most cases there is little reason to locate the discharge station 14 other than at an "end" of the conveying loop since to do otherwise would result in an "extra" or unused length of the conveying loop.

The discharge station 18 of the conveyor 6 of the present invention includes a gravity feed discharge outlet and a guide chute 66 located around and below the conveyor flights as best illustrated in FIGS. 1 and 5. When viscid material is being transported by the conveyor 6 of the present invention, not all of the material will fall off of the flights 28 and through chute 66. Rather, some sticky material is likely to remain on each of the flights 28 as the flights enter the return leg 14 of the conveyor. To overcome this problem, the present invention provides a means for scraping material from the conveyor flights at the discharge station.

Specifically, the scraper assembly 70 includes a circular plate 72 mounted partially below and to one side of the conveying leg 12 of the conveying conduit, as best illustrated in FIGS. 3 and 5, and scraper protuberances or blades 86 mounted thereon. The plate 72 is mounted for rotation in a generally vertical plane adjacent the conveying path and about a substantially horizontal axis or shaft 74 mounted in the opposing sidewalls 76 and 78 of the chute 66. Sidewall 78 has a circular aperture 79 (FIG. 3) for receiving the circular plate 72. Aperture 79 is covered by the circular mounting plate 80 which is secured around the periphery of the aperture to wall 78 and supports the shaft bearing 82. Shaft 74 is journaled in shaft bearing 82. Wall 76 supports bearing 84 on the other end of the shaft 74.

Three scraper protuberances, members, or blades 86, 86' and 86" are secured, as by welding, to the circular plate 72 and extend outwardly away from one side of the circular plate in a generally horizontal direction toward and/or into the conveying path. The protuberances 86, 86' and 86" are positioned at a substantially uniform distance from the shaft 74 and are substantially uniform peripherally spaced (in this particular instance at about 120° intervals) in a circle about the axis of the circular plate 72. Preferably, each scraper blade such as blade 86 has at least two generally planar sides, such as 88 and 90, converging at a vertex defining a substantially straight edge for contacting the leading surface of a conveyor flight.

Spaced radially inwardly of each scraper blade 86 is an associated auxiliary flight abutment means or roller bearing 92 which is secured to the circular plate 72 by bolt 94 threaded in nut 96 welded to the circular plate 72. The roller bearing 92 functions to engage a conveyor flight in response to the continued forward movement of the flight after the flight has been scraped by the associated scraper blade 86 as will be explained in detail hereinafter.

The scraper assembly 70 illustrated in FIGS. 3 and 5 is not separately powered but is instead radius-driven by the conveyor flights as they move through the discharge station and engage the scraper blades and roller bearings. Since the assembly 70 is free to rotate about its shaft 74 in either direction and at variable speeds in response to the moving conveyor flights, it is desirable, for reasons to be explained in detail hereinafter, to provide a substantially uniform drag on the rotation of the assembly. To this end, a torque limitor means 100 (FIG. 3) is provided in association with the shaft 74. The torque limitor means 100 is of conventional torque limitor design, such as the Model No. 350A-1 made by Morse Company, and is mounted around one end of shaft 74 by means of support brackets 102.

Operation of the conveyor of this invention is best illustrated with reference to FIG. 5. Two flights, 28' and 28", shown in solid lines, are moved in a forward direction through conveying leg 12 as chain 26 is pulled through the conveying loop by the counterclockwise rotation of sprocket 62. Flight 28' engages a scraper member 86 and flight 28" a roller bearing 92" to drive circular plate 72. To this end, flights 28' and 28" are spaced apart at a predetermined distance consistent with the radial distance between the scraper blades 86' and 86", the roller bearings 92' and 92", and the shaft 74, so that shortly after one flight, such as flight 28', enters the discharge station 18 and engages a scraper blade 86', another flight, such as flight 28", disengages roller bearing 92" and leaves the discharge area. In FIG. 5, scraper member 28' is shown just beginning to engage or abut the straight scraping edge of a scraper blade 86'. The scraper blade 86' engages the leading or conveying surface of the flight 28' at or near the bottom of the flight. As the flight 28' is pulled forward, from left to right, by the chain assembly 26, the flight 28' being engaged with the scraper member 86', causes the circular plate 72 to rotate in a clockwise direction whereby the scraper blade 86 travels a circular path, forwardly and upwardly, in contact with the flight 28'. As the scraper blade 86' rotates together with the circular plate 72 through a first portion of a single revolution, blade 86' scrapes along the leading surface of the flight 28' from the bottom to the top and sweeps or scrapes the viscid material off of the flight. Intermediate positions of the flight 28' and scraper blade 86', as the scraper blade moves up the flight, are shown in phantom in FIG. 5.

As the flight 28' moves along from left to right as viewed in FIG. 5, the distance between the flight 28' and the roller bearing 92' (which is associated with the scraper blade 86' in contact with the flight 28') decreases until the circular plate 72 has been rotated to the point where the scraper blade 86' has been driven to the top of the flight 28'. At this point, the roller bearing 92' just begins to contact the leading surface of the conveyor flight 28'. As the flight 28' continues forward travel, flight 28' bears against the roller bearing 92' and the circular plate 72 is driven through a second portion of the revolution via roller bearing 92. Since the roller bearing 92' is spaced radially inwardly of the scraper blade 86', the relative distance between the scraper blade 86' and the conveyor flight 28' becomes greater as scraper blade 86 rotates past its top dead center position and as the flight 28' moves past or beyond shaft 74. At the point when the flight 28' is directly over the shaft 74, the roller bearing 92' moves relatively downwardly along the face of the flight 28' and eventually clears the bottom of the flight. This process is best illustrated in FIG. 5 for the analogous situation of flight 28" and bearing 92".

Flight 28" is shown with the roller bearing 92" at the bottom of the flight just before further rotation of plate 72 would cause bearing 92" to clear the flight. Further forward travel of flight 28" causes disengagement of the roller bearing 92" as bearing 92" is pushed off the lower end of the flight 28". Thereafter, flight 28" continues to travel past the circular plate 72, around sprocket 62, and ultimately enters the return leg 14 of the conveyor.

Owing to the relationship between (1) the circular path of movement of both the scraper blade 86 and roller bearing 92 and (2) the straight line translational movement of the conveyor flights 28, the speed of rotation of the circular plate 72 varies as it is rotated by the conveyor flights. Specifically, the speed of rotation of the circular plate decreases as the conveyor flight 28' approaches the shaft 74 and is at its minimum when the flight is directly above the shaft 74. As the conveyor flight 28' moves past (to the right) shaft 74, the speed of rotation of the plate 72 again begins to increase. This non-uniform speed of rotation could result in the circular plate speeding "ahead" of the conveyor flight and then slowing down, whereupon the next following conveyor flight would impact against the blade 86 or roller bearing 92. This would obviously result in undesirable impact and cyclic fatigue loading as well as in undesirable noise. To overcome this problem, the previously described torque limiter means 100 is provided. When a conveyor flight 28 first impinges upon the scraper blade 86, though the rotational speed of the circular plate is greatest, the turning resistance on the shaft 74 holds the plate from rotating "ahead" and keeps the scraper blade 86 against the conveyor flight 28 as the driving speed decreases while the conveyor flight 28 approaches the shaft 74.

When the conveyor of the present invention is used for very sticky materials, or if otherwise desired, the scraper assembly 70 may be center-driven on shaft 74 in synchronism with movement of the conveyor flights through the discharge station. To this end, the scraper assembly 70 can be separately powered by a motor drive provided in place of, or in tandem with, the torque limiter means 100. Alternatively, by appropriate gearing or belting the scraper assembly 70 can be driven by the same prime mover as shaft 64.

The scraper assembly of the present invention need not be vertically mounted but can be inclined or horizontally mounted as well. For example, if the flights were mounted by their top ends to a chain assembly running in the upper cross wall of a conveying conduit, then the rotatable circular plate could be horizontally mounted for rotation about a vertical axis. The conveyor and scraper assembly of the present invention can be operated in either of the two possible directions ("forward" and "backward" or "clockwise" and "counterclockwise") and will operate with the same efficiency and advantages in either direction.

The conveyor of the present invention can be provided with multiple charge and discharge stations. In the case of a conveyor with multiple discharge stations, scraper assemblies may be provided for each station or only for some stations, as desired.

The conveyor of the present invention is well suited to applications requiring a minimum of shutdown time. If one or more flights should be damaged, they can quickly be removed. They do not necessarily have to be replaced since the conveyor of the present invention will function with some of the flights missing. The scraper assembly will be engaged by the remaining flights as the flights pass into the discharge station.

Though the conveyor of the present invention is illustrated as a totally enclosed conveyor, the conveyor and scraper assembly of the present invention will function properly even if the conveyor conduits are not totally enclosed. That is, the novel chain assembly structure and novel scraper assembly of the present invention are suitable for use with an open trough-type of conveyor for substantially horizontal conveying runs.

Thus it is seen that the conveyor of the present invention provides a novel chain link assembly which forms a barrier to prevent the conveyed material from directly contacting and clogging the chain bushings and the upper and lower bearing surfaces of the chain tracks. Further, a novel scraper assembly is provided for scraping viscid material off each of the conveyor flights, the assembly being entirely driven by the conveyor flights themselves and thereby not requiring a separate drive system.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. A conveyor suitable for a viscid material comprising:

conduit means for containing said material and defining a conveying path from a charge station to a discharge station;

a pair of opposed, spaced-apart guide rails situated at one side of said conduit means and defining a slot;

a plurality of spaced conveying flights within said conduit means and traversing said path;

flight transport means connected to said flights for moving said flights along said conveying path and comprising an endless articulated chain slidably mounted within said slot and having said flights secured thereto at spaced intervals, said chain being provided with side links on one side of the chain and overlapping said slot for preventing egress of said viscid material out of said conveying path and with side bars having said flights mounted thereon positioned at spaced intervals along said chain adjacent said side links; and rotatable flight scraper means at said discharge station for scraping said material from said flights, said scraper means being mounted for rotation along said path and having at least one scraper member projecting into said path at any given point in time so that each of said flights periodically abuts one of said scraper members and drives said scraper means to move said abutting scraper member across a leading surface of said flight thereby scraping said viscid material off of said flight.

2. The conveyor in accordance with claim 1 wherein each of said flights is mounted on one side of said chain and substantially perpendicular to said side links.

3. The conveyor in accordance with claim 1 in which said side links are mounted in said endless chain with a pin on each end and in which said side bars are releasably secured to said pins with removable locknuts.

4. The conveyor in accordance with claim 1 in which said conveying path has a generally rectangular cross-section and wherein said flights are generally rectangular flat plates.

5. The conveyor in accordance with claim 1 in which said scraper member has at least two generally planar sides converging at a vertex defining a substantially straight edge for contacting said leading surface of said flight.

6. The conveyor in accordance with claim 1 wherein a torque limitor means is associated with said scraper means and provides a substantially uniform drag on said scraper means during rotation.

7. A conveyor suitable for a viscid material comprising:
conduit means for containing said material and defining a conveying path from a charge station to a discharge station;
a plurality of spaced conveying flights within said conduit means and traversing said path;
flight transport means connected to said flights for moving said flights along said conveying path; and
rotatable flight scraper means at said discharge station for scraping said material from said flights, said scraper means being mounted for rotation along said path and having at least one scraper member projecting into said path at any given point in time so that each of said flights periodically abuts one of said scraper members and drives said scraper means to move said abutting scraper member across a leading surface of said flight thereby scraping said viscid material off of said flight;
said scraper means being provided with auxiliary flight abutment means associated with each said scraper member for periodically abutting the leading surface of said flight, said abutment means being located radially closer to the axis of rotation of said scraper means than said scraper member so that each of said flights periodically (a) abuts one of said scraper members and drives said scraper means to rotate through a first portion of a single revolution and (b) subsequently abuts the associated auxiliary abutment means and drives said scraper means to move said scraper off of, and away from, said scraper member as said scraper means continues rotating through a second portion of said single revolution.

8. A conveyor for a viscid material comprising:
conduit means for containing said material and defining a conveying path from a charge station to a discharge station;
an array of spaced conveying flights within said conduit means with each flight extending substantially across the conveying path;
endless articulated flight transport means connected to said flights for moving said flights along said conveying path;
rotatable flight scraper means at said discharge station for scraping said viscid material from said flights and comprising a circular plate being mounted for rotation in a generally vertical plane adjacent to said conveying path and about a substantially horizontal axis and a plurality of elongated scraping protuberances mounted on and extending away from one side of said circular plate in a generally horizontal direction toward said conveying path, said protuberances being positioned at a substantially uniform distance from said axis and substantially uniformly spaced from one another; and
an auxiliary flight abutment means adapted to engage an oncoming flight in said array provided on said circular plate between each of said elongated scraping protuberances and said axis;
said axis extending across the general direction of said conveying path at the discharge station but being situated therebelow so that upon rotation of said circular plate each of said elongated scraping protuberances is elevated in turn into said conveying path, engages a leading surface of said oncoming flight and sweeps said leading surface in a generally upwardly direction.

9. The conveyor in accordance with claim 8 wherein said circular plate is radius-driven in turn by the action of said flights and said auxiliary flight abutment means engaging said elongated scraping protuberances.

10. The conveyor in accordance with claim 8 wherein a torque limitor means is associated with said circular plate and provides a substantially uniform drag on said circular plate during rotation.

11. The conveyor in accordance with claim 8 wherein three of said scraper protuberances are present on said circular plate and are spaced about 120 degrees apart.

12. The conveyor in accordance with claim 8 wherein (a) a pair of opposed, spaced-apart guide rails are situated at one side of said conduit means and define a slot, (b) said endless articulated flight transport means is a chain mounted within said slot, (c) said chain is provided with side links on one side of the chain and overlapping said slot for preventing egress of said viscid material out of said conveying path, (d) side bars are provided at spaced intervals along said chain adjacent said side links, and (e) said flights are mounted on said side bars.

13. The conveyor in accordance with claim 12 wherein said side links are mounted in said endless chain with a pin on each end and wherein said side bars are releasably secured to said pins with removable locknuts.

* * * * *